July 19, 1966    L. K. JENSEN    3,261,422
SEAT SUSPENSION FOR A MATERIAL HANDLING TRUCK
Filed Nov. 6, 1961    3 Sheets-Sheet 1
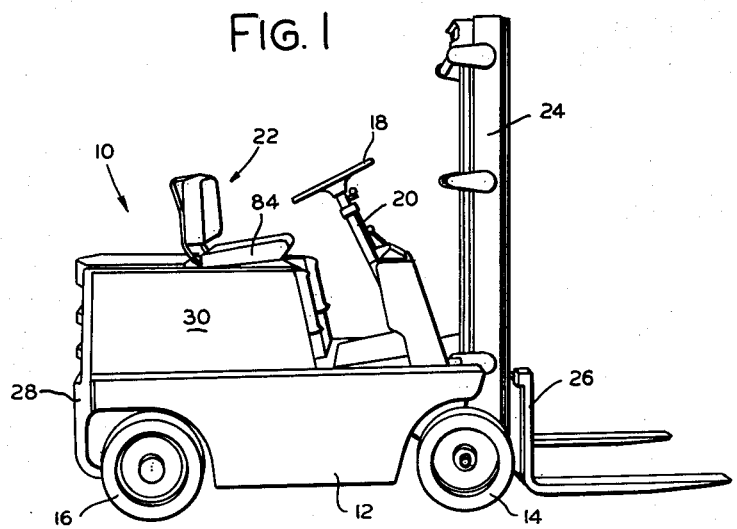
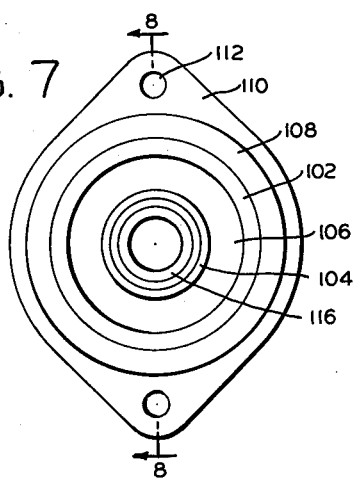
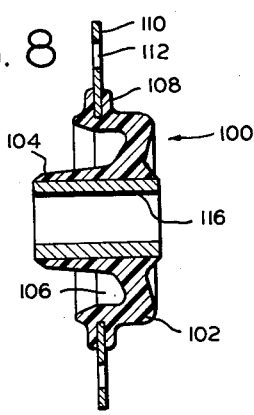
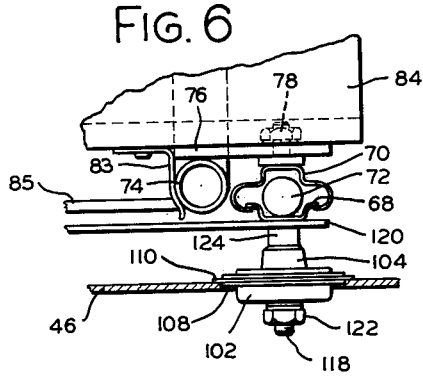
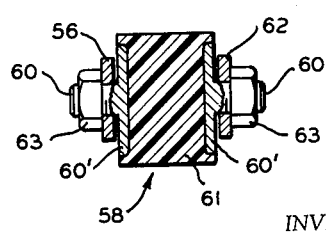
INVENTOR
LESTER K. JENSEN
BY *J. C. Wiessler*
ATTORNEY July 19, 1966 L. K. JENSEN 3,261,422
SEAT SUSPENSION FOR A MATERIAL HANDLING TRUCK
Filed Nov. 6, 1961 3 Sheets-Sheet 2

INVENTOR.
LESTER K. JENSEN
BY
ATTORNEY

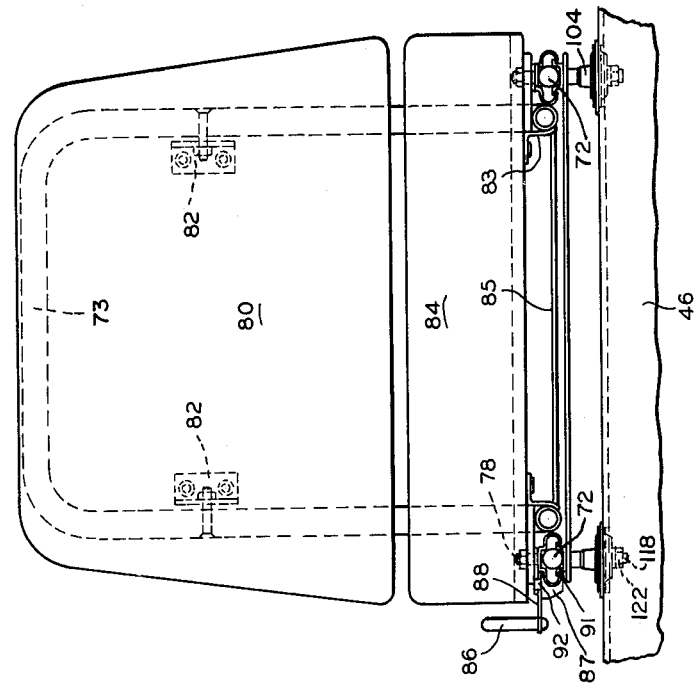
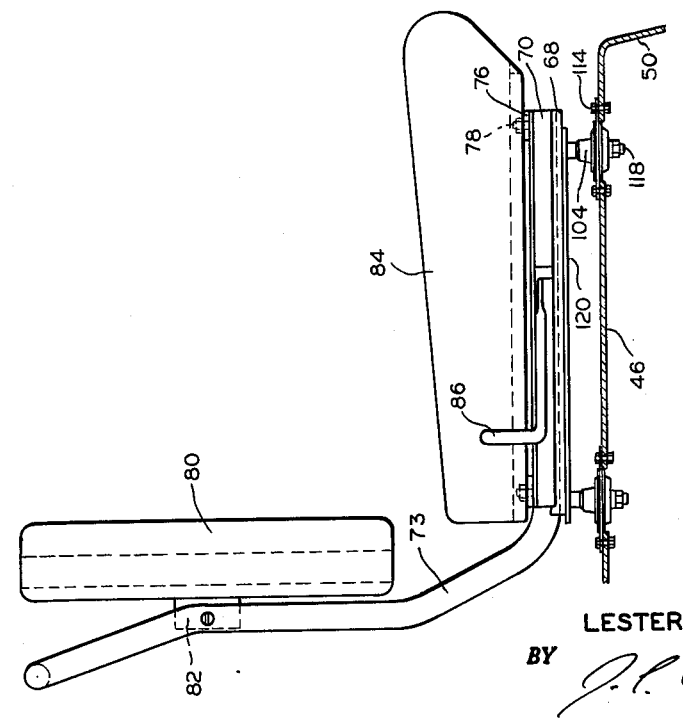
INVENTOR.
LESTER K. JENSEN

United States Patent Office 3,261,422
Patented July 19, 1966

3,261,422
SEAT SUSPENSION FOR A MATERIAL HANDLING TRUCK
Lester K. Jensen, Battle Creek, Mich., assignor to Clark Equipment Company, a corporation of Michigan
Filed Nov. 6, 1961, Ser. No. 150,254
6 Claims. (Cl. 180—69)

This invention relates to seat suspensions, and more particularly to a resilient seat suspension which is especially useful in unsprung vehicles such as industrial trucks and the like. This is a continuation-in-part of my application, Serial No. 79,195, filed December 29, 1960, now abandoned.

In the industrial lift truck field, for example, spring or other suspension systems between the frame and the wheels are not in general use, and it is uncommon to provide in such vehicles any type of shock absorbing suspension which relieves driver fatigue or promotes safety during operation over rough surfaces. Shocks occasioned by running over uneven surfaces are transmitted from the wheels through the frame to the operator, thus resulting frequently in a rough, fatiguing, and sometimes unsafe operation from the operator's standpoint. Trucks designed for outdoor use normally are equipped with pneumatic tires which absorb some portion of the road shocks encountered, but indoor trucks normally are equipped with solid tires. Some trucks of the type under discussion utilize resilient seat cushions, while others do not. A few industrial trucks are equipped with a suspension system, such as a leaf or coil springs, between the frame and the wheels, but this is undesirable because it reduces stability of the truck during load lifting operations by the elevatable mast which is mounted at one end of the truck.

My invention has as a principal object the provision of a novel suspension construction between the seat and the body of certain classes of vehicles.

Another object of my invention is to provide an improved seat suspension construction which provides significant shock absorbing capacity in a relatively small space.

Still another object of my invention is to provide an improved seat suspension which is of a relatively simple construction, low in cost, and which requires minimum maintenance.

A further object of the invention is to provide a novel seat suspension between the seat and the body of an industrial truck without reducing operational stability of the truck.

The effectiveness of my invention may be demonstrated by test results in which two facsimile lift trucks, one provided with my seat suspension and one without, were given a speed check over a one-quarter mile course of rough terrain. The vehicle provided with my invention outdistanced the one not so provided by approximately one hundred yards, thus demonstrating the improved driver control which is effected by the use of the invention.

In carrying out my invention I have devised a motor compartment cover plate having a plurality of openings therein with which resilient cushioning members are associated, such resilient members being securely connected both to the cover plate and to a seat means which is held resiliently in vertically spaced relation to the cover plate, whereby the cover plate also serves to support the seat means. I prefer to provide at one end of the cover plate a pivotal connection with a vehicle body or other device with which the seat suspension may be used so that the entire seat construction and its resilient mounting is pivotable with the cover plate to provide, for example, ready access to an engine compartment of industrial lift trucks.

The foregoing and other objects, features and advantages of my invention will become apparent in view of the following description taken in conjunction with the drawings, wherein:

FIGURE 1 is a side elevational view of an industrial lift truck which embodies the instant seat suspension;

FIGURE 4 is a side view taken in partial section of a modification of the invention as shown in FIGURES 2 and 3;

FIGURE 5 is a front elevational view of FIGURE 4;

FIGURE 6 is an enlarged view of a portion of FIGURE 5;

FIGURE 7 is a plan view of the resilient cushioning construction which is utilized in the modified construction of FIGURES 4 and 5;

FIGURE 8 is a view in section taken along line 8—8 of FIGURE 7; and

FIGURE 9 is a view in section taken along line 9—9 of FIGURE 3.

Figure 2:
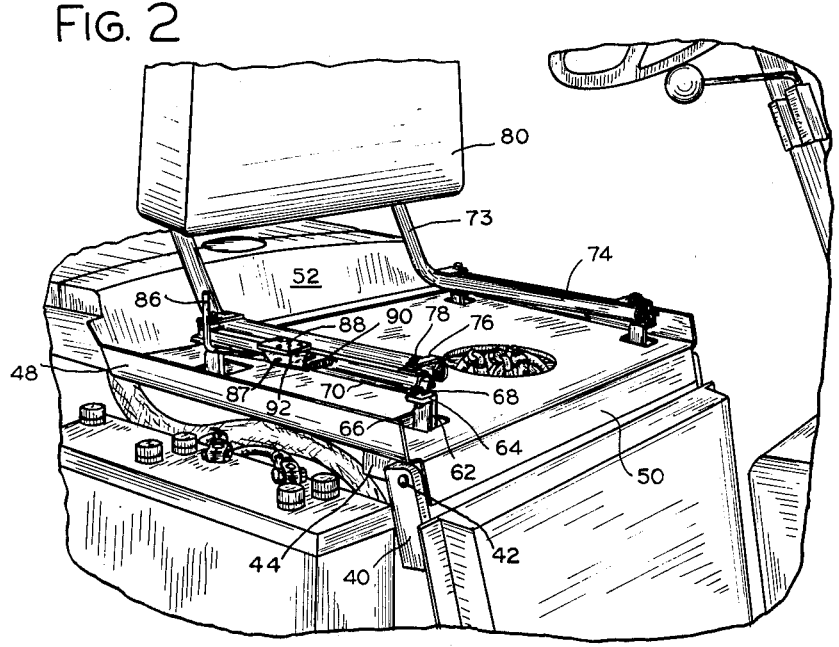
FIGURE 2 is a front quarter view showing my seat suspension construction in position for use with the seat cushion removed.

Referring now in detail to the drawings and first to FIGURE 1, the industrial lift truck 10 of FIGURE 1 is generally of conventional construction and comprises a main frame 12 that is supported at its forward end on drive wheels 14 and its rear end on steering wheels 16. The steering wheels 16 are controlled by a hand steering wheel 18 arranged at the upper end of a steering column 20 located adjacent an operator's seat and suspension construction 22 of my invention. Supported at the forward end of the truck frame 12 is a generally vertically extending tiltable mast or upright assembly 24, in which a load supporting carriage assembly 26 is upwardly and downwardly movable, and supported at the rear end of the truck frame 12 is a counterweight 28. The truck 10 is powered by any suitable prime mover means which is preferably supported in the frame 12 and located in a motor compartment 30 beneath the seat construction 22. The prime mover is operatively connected to the front drive wheels 14 through suitable torque transmitting means (not shown).

Figure 3:
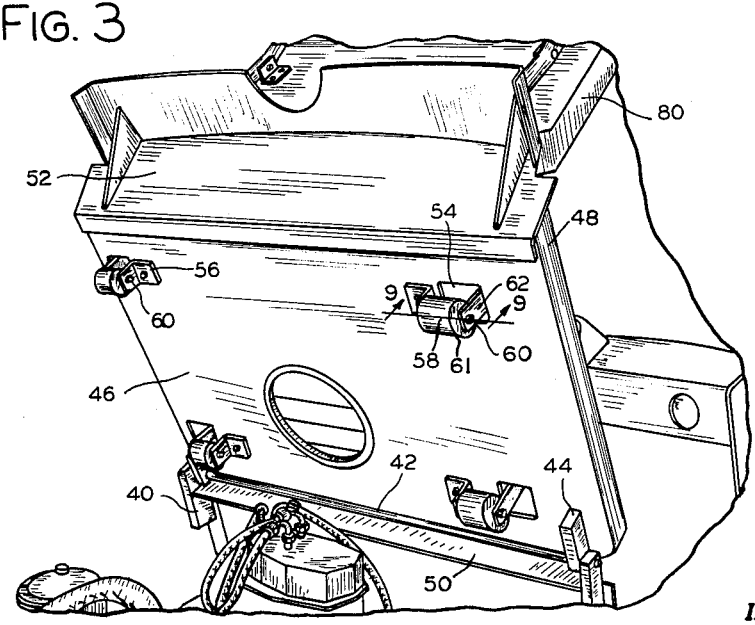
FIGURE 3 is a rear quarter view of the device shown in FIGURE 2 with the cover plate pivoted forwardly of the truck and exposing the engine compartment thereof.

Referring to FIGURES 2, 3 and 9, a pair of laterally spaced upright support frame members 40 are provided for supporting the seat construction 22 at the desired elevation by means of a transverse pivot rod 42 which is secured at its opposite ends in openings provided in upright members 40 and which passes through openings provided in a pair of laterally spaced, downwardly depending bracket members 44 secured, as by welding, to a motor compartment cover plate means 46 which is pivotable on rod 42 from the operating position shown in FIGURE 2 covering the prime mover to the position shown in FIGURE 3 in which the prime mover in compartment 30 is exposed for maintenance and the like. A pair of upwardly extending flanges 48 are provided at opposite sides of cover plate 46, and downwardly and upwardly extending flange portions 50 and 52 are provided at the front and rear edges of the cover plate, respectively. A square opening 54 is provided in each corner portion of the cover plate 46 and adjacent the inner side of each opening 54 is provided at right angle bracket 56, the horizontal leg of which is securely bolted to the bottom surface of cover plate 46. The vertical legs of brackets 56 are connected to respective upright seat supporting brackets 62 which extend upwardly through adjacent openings 54 by means of resilient cushioning or snubber members 58. Each resilient member has a resilient portion 61 and a pair of outwardly extending studs 60 having head portions 60' bonded to opposite ends of resilient portion 61 and concentric with the longitudinal axis thereof. The studs 60 pass through respective brackets 56 and 62 and are secured thereto by nuts 63 as shown. The nuts 63 are tightened to secure associated bracket members 56 and 62 in tight abutting relation with the opposite ends of the intermediate resilient snubber member 58. Each upright bracket 62 terminates at its upper end in an outwardly extending flange 64 to which is secured by bolt and nut means 66 the web of one end portion of one of a pair of transversely spaced, longitudinally extending U-shaped adjustment track members 68 having outwardly extending flanges at the upper ends thereof (see FIGURES 2 and 6). A longitudinally adjustable, clover-shaped track 70 overlies each track member 68 and embraces the flange portions thereof, being supported for sliding movement thereon by a pair of longitudinally spaced balls 72, one of which is shown in each track, interposed between the track members. The adjustment track means and connection thereof with the seat construction, to be described, is similar in both embodiments of the invention disclosed herein and is best illustrated in FIGURES 4–6.

A generally L-shaped seat frame 73 is comprised of a continuous hollow tubular construction having a pair of transversely spaced, longitudinally extending leg members 74 which are secured at opposite end portions to the upper clover leaf portion of upper track member 70 by means of outwardly extending brackets 76 and bolts 78, while the upwardly extending inverted U-shaped portion of seat frame 73 supports a brackrest cushion 80 by means of a pair of transversely spaced right angle brackets 82 which are secured to the tubular frame and cushion by bolt means. A seat cushion 84, which is removed in FIGURE 2, is normally secured to each end of each horizontal leg member 74 by means of an inverted L-shaped bracket 83. Each laterally spaced pair of brackets 83 is afforded support by a transverse connector plate 85.

The seat frame, cushions and upper track members 70 are adjustable longitudinally of cover plate 46 and lower track members 68 on balls 72, the desired longitudinal position of adjustment being secured by a manually actuated pivoted pawl means 86. The pawl 87 is supported from the one upper track member 70 by a bracket 88, and one end of the pawl is urged into latching position with a selected one of a plurality of longitudinally spaced notches formed in the adjacent lower track member 68, one of which is shown in FIGURE 5 at numeral 91, by means of a tension spring 90 which is secured to the upper track member 70 at its one end and to the pawl 87 at its other end. Pawl 87 is pivoted to bracket 88 by a pin 92 and is normally actuated into engagement with one of the adjustment notches by spring 90, longitudinal adjustment of the seat being effected by pivoting pawl 87 inwardly against spring 90 to release the pawl from the notch, thereby permitting the seat to be actuated by the operator longitudinally to a second selected position at which pawl 87 is released for engagement with another notch.

It will now be understood that the seat construction of my invention is resiliently supported from the cover plate 46 at the four locations of the brackets which are connected to resilient cushioning members 58, and that within the boundary limits of openings 54 and the limitations of resiliency of members 58 the seat construction is supported resiliently for movement in any direction. It will be noted that members 58 are loaded primarily in shear whenever an operator is seated upon the seat construction and the truck is driven over rough terrain which imposes vertical impact forces on the seat suspension. Eccentric or non-vertical components of such impact forces are also absorbed in the resilient seat suspension which is capable of movement in any direction within the limitations mentioned above.

Referring now to the embodiment of FIGURES 4–8, wherein similar parts have been similarly numbered, a generally cup-shaped resilient cushioning member 100 comprises an outer annular resilient portion 102 connected to an inner annular upwardly projecting resilient portion 104 by a resilient web section 106; a circumferential forked flange portion 108 is bonded to a metal support flange 110. Flange 110 has a pair of openings 112 formed therein for receiving a pair of bolts 114 which are adapted to securely connect a resilient member 100 to cover plate 46 at each corner section of the seat assembly. A tubular sleeve 116 is preferably bonded to the inner wall of inner annular portion 104 for receiving an elongated stud connecting member 118 which extends through the cushioning member and is preferably secured, as by welding, to a load equalizing plate 120 at its upper end and which threadedly receives a nut 122 at its lower end which is drawn into tight abutment with the lower end of sleeve 116. A spacer sleeve 124 embraces the upper end of stud 118 and abuts plate 120 at its upper end and sleeve 116 at its lower end. Cover plate 46 is pivotable about a pivot rod 42 which is supported from frame members 40, the same as in FIGURES 2 and 3.

It will be seen that the seat suspension of the modified design shown in FIGURES 4 through 8 functions in substantially the same manner as the embodiment of FIGURES 2 and 3, providing resilient cushioning members 100 which are loaded primarily in shear under load, and which are mounted on the vehicle for universal movement within the limitations of the material of the resilient members 100 and the amount of transverse movement available in any direction of inner annular portion 104 within outer annular portion 102. Connecting plate member 120 tends to stabilize and equalize the load upon each of the four resilient assemblies which support the seat construction from supporting plate 46.

From the foregoing it will now be appreciated that my invention provides a rugged, simple and maintenance-free, low-cost seat suspension construction which affords a relatively smooth and level "ride." My invention provides a cushioning and shock-absorbing means in both horizontal and vertical planes for providing a relatively comfortable ride for an operator, while also affording the operator improved steering control of the vehicle when it is traveling over uneven floors or rough terrain, as a result of which the vehicle can be operated for prolonged periods at higher speeds with less driver fatigue and with no reduction in vehicle stability.

Although only two embodiments of the invention have been illustrated and described in detail, various changes in form, construction and relative arrangement of parts may be made to suit requirements.

I claim:

1. In an industrial truck having a material handling device located forwardly thereof, an operator's station located rearwardly of the material handling device and a motive power generating compartment located beneath a portion of the operator's station, a resiliently mounted seat construction comprising an upper cover plate disposed above and overlying at least a portion of said compartment, pivot means supporting the cover plate from transversely spaced side portions of said compartment so that said cover plate is pivotable forwardly from a position overlying said compartment to expose said compartment, a plurality of openings in the cover plate, operator's seat means located in vertically spaced relation from said cover plate, means supporting said seat means from said cover plate including deformable resilient means operatively connected at all times to said cover plate and said operator's seat means irrespective of the pivoted position of said cover plate and seat means and said vertical spacing therebetween varying as a function of the load upon said seat means causing varying deformation of said resilient means, one of said supporting means being mounted in each said opening such that a portion thereof extends above said cover plate and a portion thereof extends below said cover plate, and load equalizing means extending between and connected to certain ones of said seat support means, said equalizing means being spaced vertically from and intermediate the cover plate and seat means.

2. A resilient seat construction as claimed in claim 1 wherein said resilient means comprises a yieldable member which extends through each of said openings in the cover plate, a portion of said yieldable member being secured to the cover means and another portion thereof being secured to said seat means.

3. A resilient seat construction as claimed in claim 1 wherein said seat support means comprises an essentially vertically extending yieldable member extending through each of said openings and having an outer annular portion secured to the said plate and an inner annular portion operatively connected to the said seat means.

4. A resilient seat construction as claimed in claim 1 wherein each of said resilient members is of generally annular shape having a central opening therethrough and including an elongated connecting member, the periphery of said central opening being connected to said elongated connecting member and the outer peripheral portion of said resilient member being supported from said cover plate adjacent each of said cover plate openings.

5. For use with an industrial truck having an operator's station overlying a motive power generating compartment and support means adjacent the front end of the compartment, an upper compartment cover plate mounted pivotally from the support means and overlying the compartment, said cover plate being pivotal from said overlying position forwardly to at least a semi-upright position for exposing said compartment from above and permitting access thereto, cover means connected to the truck enclosing the sides and rear of said compartment, said cover plate being pivotal forwardly independently of said cover means, operator control means located a relatively short distance forwardly of said cover means, seat means supported from said cover plate in vertically spaced relation thereto, a plurality of openings in the cover plate, seat support means associated with each said opening and connected continuously to the said cover plate and to said seat means irrespective of the pivoted position of said cover plate and seat means, each said seat support means including a downwardly extending elongated connecting member connected at one end to the said seat means and passing through one of said openings and a resilient member extending into said opening and secured between said cover plate and said connecting member, and load equalizing means extending between and connected to certain ones of said seat support means, said equalizing means being spaced vertically from and intermediate the cover plate and seat means.

6. In an industrial truck having a material handling device located forwardly thereof, an operator's station located rearwardly of the material handling device, operator control means located a relatively short distance forwardly of said operator's station, a motive power generating compartment located beneath at least a portion of the operator's station and cover means connected to the truck for enclosing the sides and rear of said compartment, a resiliently mounted seat construction comprising an upper compartment cover plate disposed above and overlying at least a portion of said compartment and adapted to combine with the cover means to close said compartment, pivot means supporting said cover plate from transversely spaced side portions of said compartment so that said cover plate is pivotable forwardly from a position overlying said compartment to expose said compartment from above, said cover plate being pivotal forwardly independently of said cover means, a plurality of openings in the cover plate, operator's seat means located in vertically spaced relation from said cover plate, means supporting said seat means from said cover plate including deformable resilient means operatively connected at all times to said cover plate and said operator's seat means irrespective of the pivoted position of said cover plate and seat means and said vertical spacing therebetween varying as a function of the load upon said seat means causing varying deformation of said resilient means, one of said seat support means being mounted in each said opening such that a portion thereof extends above said cover plate and a portion thereof extends below said cover plate, and load equalizing means extending between and connected to certain ones of said seat support means, said equalizing means being spaced vertically from and intermediate the cover plate and seat means.

References Cited by the Examiner

UNITED STATES PATENTS

| | | | |
|---|---|---|---|
| 709,619 | 9/1902 | Wangerin | 248—384 |
| 1,356,558 | 10/1920 | Purcell | 297—193 |
| 1,668,014 | 5/1928 | Hansen | 248—372 |
| 1,836,353 | 12/1931 | Withrow | 248—384 |
| 1,937,055 | 11/1933 | Curtiss | 248—399 |
| 2,014,467 | 9/1935 | Cheyney | 248—22 |
| 2,237,677 | 4/1941 | Lewis | 180—69 X |
| 2,269,968 | 1/1942 | Baker | 248—384 |
| 2,347,061 | 4/1944 | Persons | 297—209 X |
| 2,374,809 | 5/1945 | Faulhaber | 297—209 |
| 2,387,066 | 10/1945 | Harding | 248—22 X |
| 2,639,760 | 5/1953 | Von Szilagyi | 297—209 X |
| 2,678,082 | 5/1954 | Walker | 248—399 |
| 2,681,688 | 6/1954 | Haltenberger. | |
| 2,774,498 | 12/1956 | Cordes et al. | |
| 2,783,959 | 3/1957 | Boschi et al. | 248—22 |
| 2,884,045 | 4/1959 | Walsh | 297—209 |
| 2,931,452 | 4/1960 | Mackie | 180—69 |

FOREIGN PATENTS

| | | |
|---|---|---|
| 1,092,178 | 11/1954 | France. |

A. HARRY LEVY, *Primary Examiner.*